United States Patent Office 3,113,907
Patented Dec. 10, 1963

3,113,907
POLYMERIC COMPOSITIONS AND PREPARATION THEREOF
Stanley Tocker, Wilmington, Del., assignor to E. I. du Pont de Nemours and Company, Wilmington, Del., a corporation of Delaware
No Drawing. Filed Sept. 9, 1960, Ser. No. 54,840
15 Claims. (Cl. 161—165)

This invention relates to organic polymeric structures and, particularly, to shaped articles such as polymeric films suitable for outdoor use.

This application is a continuation-in-part of my co-pending application Serial No. 847,704, filed October 21, 1959.

Many organic polymeric structures, such as structures of polyethylene, polypropylene, poly(vinylidene chloride) and the like deteriorate rapidly when subjected to sunlight. The materials are sensitive to light in the ultraviolet range, particularly in the wave length range of 2900–3800 A. Exposure to the ultraviolet light tends to embrittle the structures and reduce the level of their electrical and physical properties substantially. Some polymers acquire an undesirable color upon exposure to ultraviolet light.

The use of certain chemical compounds as ultraviolet light absorbers in mechanical mixture with the polymers is known. Thus, compounds such as benzophenones or salicylic acid esters have been incorporated in the molten polymer prior to forming a structure or they have been coated on the surface of the polymeric structure. In either case, the protection afforded by these compounds is not permanent. The compounds gradually exude to the film surface and disappear from the polymeric structure due to mechanical abrasion or volatility.

The object of the present invention is to provide a substantially permanent weather-resistant organic polymeric shaped article, particularly a self-supporting film, suitable for outdoor use. It is a further object to provide a process for incorporating ultraviolet light absorbent compounds into the polymeric articles so that the compounds are firmly attached to the articles. Other objects will appear hereinafter.

The objects are accomplished by a copolymer of 90–99.99 mole percent of at least one unsaturated compound, compound A, having the structural formula:

$$H_2C=\underset{R_2}{\overset{R_1}{C}}$$

wherein $R_1$ is selected from the group consisting of hydrogen, halogen and alkyl having 1–4 carbon atoms, preferably wherein $R_1$ is hydrogen or an alkyl group having 1–4 carbon atoms,
$R_2$ is selected from the group consisting of hydrogen, halogen, alkyl of 1–4 carbon atoms, carboalkoxy, carboaryloxy, phenyl, acetoxy, acetyl and cyano, preferably wherein $R_2$ is hydrogen and .01–10 mole percent, preferably .1–10 mole percent of at least one unsaturated compound, compound B, having the structural formula:

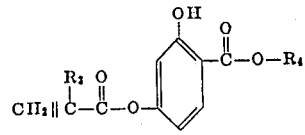

wherein $R_3$ is selected from the group consisting of hydrogen and alkyl having 1–3 carbon atoms,
$R_4$ is an alkyl group having 1–4 carbon atoms,
the copolymer preferably having an inherent viscosity of at least 0.3.

Specifically, the objects are accomplished by a copolymer of at least one polymerizable compound selected from the group consisting of ethylene, propylene, styrene, vinylidene chloride, vinyl acetate, vinyl chloride, vinyl fluoride, acrylonitrile and butyl acrylate and .01–10 mole percent, preferably .1–10 mole percent, of at least one ethylenically unsaturated compound selected from the group consisting of methyl 2-hydroxy-4-methacryloxybenzoate and methyl 2-hydroxy-4-acryloxybenzoate, the copolymer having an inherent viscosity of at least 0.3.

It is also possible to use a homopolymer of compound B in the form of a coating on a shaped article of or as part of a blend with a polymer of compound A, polyesters and epoxy resins. Thus, shaped articles of polymers (homopolymers and copolymers) of ethylene, propylene, butene-1, pentene-1, hexene-1, vinyl chloride, vinylidene chloride, methyl, ethyl, butyl, octyl, ethylhexyl, cyclohexyl and phenyl acrylates and methacrylates, vinyl acetate, vinyl propionate, acrylonitrile, polyethylene terephthalate, etc., can be coated with homopolymers of compound B.

The homopolymer coating may be applied to the shaped articles from a solution of the homopolymer in a solvent such as ethyl acetate, dioxane, acetone, toluene, benzene, etc., or a dispersion of the homopolymer in water or in a solvent. Coating may be accomplished by a dipping process, a brushing process or a spraying process. It is also possible in some cases to melt press the homopolymer on the polymeric shaped article. If necessary, the base material (the shaped article) may be treated to improve the adherability of its surface by a method such as that described in U.S. Patent 2,715,076 prior to the coating step. In order to achieve effective protection from ultraviolet light, the ultimate homopolymeric coating should have a thickness of at least 0.1 mil. Although the coating can be thicker, it may be undesirable from an economic standpoint to use coating thicknesses greater than about 2 mils. For most substrates, the homopolymeric coating need not be any thicker than 0.5 mil.

When used in a blend, it is desirable to incorporate 0.5–20% by weight of the homopolymer of compound B into the thermoplastic polymeric resin prior to using the resin either as a coating or a shaped article such as a self-supporting film, a filament, a tube, a rod, and the like or as an adhesive. The incorporation process may be accomplished by any of the conventional procedures known to those in the art such as milling or wet blending (dissolving the polymers in a common solvent).

Although incorporation of the homopolymers of this invention with thermoplastic polymeric resins provides some improvement for all the polymers enumerated previously, the blending procedure is particularly effective with polymers having polar bonds. Such polymers include the acrylate and methacrylate polymers, vinyl, acetate polymers, vinyl chloride polymers, vinylidene chloride polymers, polyesters and epoxy resins.

Of particular interest is the blending of the homopolymers of compound B with adhesive polymeric resins such as the acrylic, epoxy and polyester adhesive resins. The adhesive resins containing the homopolymers of the invention may then be used as a coating or in a laminate. When used in a laminate, the adhesive containing the homopolymer of the invention will tend to protect the substrate but more important the adhesive itself will be resistant to ultraviolet light and, thus, provide a weatherable bond that maintains the laminate for extended periods. Among the polyester-based adhesives which are benefited by the incorporation of the homopolymers of compound B are those polyester and copolyester compositions disclosed in U.S. Patents Nos. 2,765,251, 2,623,-033, 2,698,239 and 2,698,241 which are usually obtained by reacting a slight stoichiometric excess of ethylene glycol with dimethyl esters of terephthalic, sebacic, isothalic, and/or adipic acids. Among the acrylic adhesives which may be used with the homopolymers of compound B are those disclosed in U.S. Patents Nos. 2,464,826 and 2,949,-445. The epoxy adhesives which are benefited by incorporating the homopolymers of compound B include those that are prepared by reaction of epichlorohydrin and bisphenol A and sold under the names "Epon" 1004,* 1007,* 1009,* and Bonding Agent R-313.**

It should also be understood that he homopolymers of compound B may be used alone as the basis for shaped articles that are resistant to degradation by ultraviolet light. These homopolymers may be extruded at elevated temperatures in the form of self-supporting films, filaments, rods, tubes, etc. Alternatively, the homopolymers may be cast from solutions in certain solvents such as ethyl acetate, methyl ethyl ketone, benzene, toluene, etc., in the form of a shaped article.

In all cases, the homopolymers and the copolymers may be used along with pigments, fillers, heat stabilizers, plasticizers, or other ultraviolet light absorbers if desired as long as these additives do not detract from the effectiveness of the polymers.

POLYMERIZATION OF STABILIZING MONOMERS

The process for preparing the polymers (copolymers with

and homopolymers) involves first preparing the acrylic ester monomer from a dihydroxybenzoate and an acrylic halide or acrylic acid. The group of compounds B for use in this invention includes methyl 2-hydroxy-4-methacryloxybenzoate, methyl 2-hydroxy-4-acryloxybenzoate, ethyl 2-hydroxy-4-methacryloxybenzoate, methyl 2-hydroxy-4-ethacryloxybenzoate, butyl 2-hydroxy-4-methacryloxybenzoate and propyl 2-hydroxy-4-methacryloxybenzoate.

The next step involves subjecting the monomer(s) preferably in a solvent such as hexane, benzene, toluene, to a temperature of −40° C. to 300° C. and a pressure of 1–3000 atmospheres in the presence of a catalyst for a contact time sufficient to form the polymer, usually at least 20 seconds for a continuous process and at least 3 minutes for a batch process, and then isolating the resulting copolymer or homopolymer.

In the preparation of copolymers, when high pressures are used, 800 atmospheres and above, a conventional

* Manufactured by Shell Chemical Company.
** Manufactured by C. H. Briggs Company.

peroxide (di-tertiary butyl peroxide) or azo catalyst (alpha, alpha'-azobisdicyclohexanecarbonitrile) may be used and the temperature is preferably 25°–175° C.

It is believed that the essential feature of this type of catalyst, or more properly termed "initiator" is that it is capable of generating free radicals. These free radical initiators, whether they be generated from a peroxide compound or from an azo-type compound combine with a polymerizable monomer to form a new free radical; the new free radical combines with another monomer molecule to form still another free radical; this process is repeated until there is propagated a long polymer chain, as is well known in the art. Polymer chain growth terminates when the free radical-bearing polymer fragment encounters another free radical, which, for example, may be another growing polymer chain or an initiator free radical.

Typical peroxides which function as initiators include tertiary-butyl peracetate, benzoyl peroxide, di-tertiary-butyl peroxide, di-tertiary-butyl peroxydicarbonate, 2,2-bis-(tertiarybutylperoxy) butane, dimethyl dioxide diethyl dioxide, dipropyl dioxide, propyl ether dioxide and propyl methyl dioxide. Organic hydroperoxides also applicable are, for example, tertiary-butylhydroperoxide, cumene hydroperoxide, ethyl hydroperoxide, and can be used to initiate polymerizations of this kind. Combinations such as ammonium persulfate with a reducing agent can also be used. Typical azo compounds which decompose to liberate free radicals for initiation of polymerization include such catalysts as alpha, alpha'-azobisdicyclohexanecarbonitrile, alpha,alpha' - azobisisobutyronitrile, triphenylmethylazobenzene, 1,1' - azodicycloheptanecarbonitrile, alpha, alpha'-azobisisobutyramide, lithium, azodisulfonates, magnesium azodisulfonate, dimethyl alpha, alpha'-azodiisobutyrate, alpha, alpha'-azobis(alpha, gamma-dimethylvaleronitrile) and alpha, alpha'-azobis(alpha, beta-dimethylbutyronitrile).

For homopolymerization of compound B, it has been found that only the aforementioned azo catalysts are sufficiently effective to provide adequate yields.

"Coordination" catalysts, as defined in U.S. Patent 2,822,357, may also be used to effect copolymerization. Specifically, such "coordination" catalysts are composed of:

(A) A compound containing at least one metal of the group consisting of metals of groups IVa, Va and VIa of the periodic table, iron, cobalt, copper, nickel and manganese, said metal having directly attached thereto at least one substituent from the group consisting of halogen, oxygen, hydrocarbon and —O-hydrocarbon; and (B) A reducing compound selected from the group consisting of metal hydrides and compounds having a metal of groups I, II and III of the periodic table, said metal being above hydrogen in the electromotive series, attached directly through a single bond to a carbon atom, said carbon atom selected from the group consisting of trigonal carbon and tetrahedral carbon.

In the above definitions, periodic table means Mendeleeff's Periodic Table of the Elements, 25th ed., Handbook of Chemistry and Physics, published by the Chemical Rubber Publishing Co. Specific examples of compound (A) included in the above definition are titanium tetrachloride, titanium tetrafluoride, zirconium tetrachloride, niobium pentachloride, vanadium tetrachloride, vanadyl trichloride, tantalum pentabromide, cerium trichloride, molybdenum pentachloride, tungsten hexachloride, cobaltic chloride, ferric bromide, tetra(2-ethylhexyl)-titanate, tetrapropyl titanate, titanium oleate, octylene glycol titanate, triethanolamine titanate, tetraethyl zirconate, tetra(chloroethyl) zirconate, and the like. Specific examples of compound (B) in this definition are phenyl magnesium bromide, lithium aluminum tetraalkyl, aluminum trialkyl, dimethyl cadmium, diphenyl tin, and the like.

Copolymerization, as well as homopolymerization, is preferably carried out in a solvent medium. Among the solvents which have been found useful in the present invention are hydrocarbons and halogenated hydrocarbons: hexane, benzene, toluene, cyclohexane, bromobenzene, chlorobenzene, o-dichlorobenzene, tetrachloroethylene, dichloromethane and 1,1,2,2-tetrachloroethane. Heterocyclic compounds such as tetrahydrofuran, thiophene and dioxane may also be used. The preferred solvents, particularly for homopolymerization, are the nonpolar and aromatic solvents such as n-hexane, benzene, cyclohexane, n-octane, n-decane, dioxane, carbon tetrachloride and para-xylene. It has also been found desirable for homopolymerization of compound B to use concentrations of the monomer, compound B, in the solvent in the range of 2 to 20% by weight. In some instances, copolymerization may be effected without a solvent or in an emulsion or slurry system.

In copolymerization, the ratio of the light stabilizing monomer, compound B, to ethylene and/or other monomer, compound A, reacted therewith should be such that the final copolymer is composed of .01–10 mole percent of the stabilizing compound and 99.99–90 mole percent of the other monomer or monomers. Less than 0.1 percent of the stabilizer does not provide adequate protection against ultraviolet light. More than 10 percent tends to affect adversely the physical properties of the basically polyethylene or polypropylene, etc., structure. Between 0.1 and 10 percent provides the best protection agains ultraviolet light. It has been found that the reaction is very efficient so that a reaction mixture of about .01–10 mole percent of the stabilizing monomer and about 99.99–90 mole percent of the remaining monomer or monomers usually will provide the desired polymer product.

The polymer product, in its preferred form (i.e., reaction product of a light stabilizing monomer and ethylene or the like or the homopolymer) is a substantially linear polymer having pendant groups of the formula:

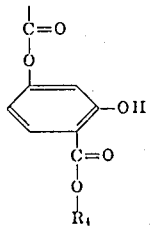

wherein $R_4$ is an alkyl group having 1–4 carbon atoms, the polymer having an inherent viscosity of at least 0.3.

The determination of the structure is accomplished by Infrared Spectral Techniques* known to those skilled in the art. The majority of the infrared spectra herein are taken on pressed films by the use of a Perkin-Elmer Model 21 Spectrophotometer and a Perkin-Elmer Infracord Spectrophotometer.

Measurements of ultraviolet light absorption were carried out in accordance with procedures described in "Analytical Chemistry," by C. R. N. Strouts, J. H. Gilfillan and H. N. Wilson, volume II, chapter 22, Oxford University Press, 1955.

The invention will be more clearly understood by referring to the examples which follow, Example 1 representing the best mode contemplated for practicing the invention. It is understood that the examples, although illustrating specific embodiments of the present invention, should not be considered limitative of the invention.

The light stability test used in the examples was carried out by exposing the films to the action of a bank of Westinghouse Sunlamps for the periods indicated.

Inherent viscosity, which is directly related to the molecular weight of the polymer, is defined by L. H. Cragg in the Journal of Colloid Science, volume I, pages 261–9 (May 1946), as:

$$\text{Inherent viscosity} = \frac{\ln \text{relative viscosity}}{C}$$

where relative viscosity is the ratio of the solution viscosity to the solvent viscosity, and C is the concentration of solute in solution measured as grams of polymer per 100 ml. of solution.

*Examples 1 and 2.—Preparation of Methyl 2-Hydroxy-4-Methacryloxybenzoate and Its Copolymerization With Ethylene and Styrene*

A mixture of 8.5 grams of methyl 2,4-dihydroxybenzoate and 5.0 grams of methacrylyl chloride was treated with 20 ml. of anhydrous pyridine with stirring. After standing for 15 minutes at room temperature, the mixture was heated in a water bath at 70–80° C. for 5 minutes, then cooled to 15° C. and poured into 500 ml. of 3% aqueous hydrochloric acid containing 100 grams of crushed ice. The aqueous mixture was immediately extracted with ether; the ether extract was dried over anhydrous sodium sulfate; and the ether was removed in a vacuum oven at 40–50° C. to give 9.5 grams of methyl 2-hydroxy-4-methacryloxybenzoate.

In a 300 ml. shaker tube was placed a solution of 112 ml. benzene, 0.2 gram of 1,1'-azobisdicyclohexanecarbonitrile and 1.5 grams of the methyl 2-hydroxy-4-methacryloxybenzoate prepared above. Sufficient ethylene was pressured in at room temperature to provide an autogenous pressure of approximately 13,000 p.s.i. at the polymerization temperature of 120° C. The vessel was periodically repressured with ethylene in order to maintain an internal pressure of 12,500–13,000 p.s.i. After 45 minutes, the reaction was stopped and the product was purified by washing with methanol in an Osterizer. The yield of dried polymer was 17.1 grams.

A clear 2–3 mil film was prepared by pressing a one-square inch sample at 100° C. under 20 tons pressure. Infrared analysis, based on the ester band at 1725 cm.$^{-1}$, showed the presence of about 0.7 mole percent of the methacrylic ester units in the polymer. Dissolving the polymer in toluene and reprecipitation did not reduce the ester absorption, indicating that copolymerization had occurred. The inherent viscosity taken on a solution of .09 gram of the polymer in 100 ml. of alpha-chloronaphthalene at 125° C. was 0.83.

The film of the copolymer was flexible after 800 hours exposure to a bank of Westinghouse F–S ultraviolet sunlamps; a polyethylene control film after 150 hours cracked upon flexing.

The test film showed no evidence of exudation of the stabilizer, whereas another polyethylene control film containing methyl 2-hydroxy-4-methacryloxybenzoate but not copolymerized with the polyethylene showed evidence of exudation on long-term exposure.

For Example 2, a solution of 112 ml. of benzene, 0.2 gram of alpha, alpha'-azobisdicyclohexanecarbonitrile, 0.5 gram of methyl 2-hydroxy-4-methacryloxybenzoate prepared as described above and 25 grams of freshly distilled styrene was placed in a reaction flask swept free of air by a stream of nitrogen. The reaction mixture was heated at reflux for one hour after which the copolymer was isolated and purified by washing with methanol in an Osterizer. Infrared analysis of a pressed film from the copolymer showed it to contain approximately 0.8 mole percent of units derived from the light-stabilizing monomer. A film pressed from this copolymer showed no evidence of yellowing after 600 hours exposure to a bank of ultraviolet sunlamps; a polystyrene control film was definitely yellow after 150 hours exposure.

*Examples 3–7*

Following substantially the procedures of Examples 1 and 2, copolymers of the following monomers were pre-

* W. M. D. Bryant and R. C. Voter, Journal of American Chemical Society, 75, 6113 (1953). F. W. Billmeyer, "Textbook of Polymer Chemistry," Chapter 7, Interscience Publishers, 1957.

pared and pressed into films using the catalysts shown in the following table:

TABLE

| Example | Compound A | Mole Percent Compound B | Catalyst | Inherent Viscosity |
|---|---|---|---|---|
| 3 | Propylene | 0.4 methyl 2-hydroxy-4-acryloxybenzoate. | α,α'-Azodicyclohexanecarbonitrile. | 0.41 |
| 4 | Butyl acrylate. | 0.3 butyl 2-hydroxy-4-methacryloxybenzoate. | Alpha, alpha'-azo-bisisobutyronitrile. | 0.04 |
| 5 | Vinyl acetate. | 0.8 methyl 2-hydroxy-4-methacryloxybenzoate. | ...do......... | 0.08 |
| 6 | Acrylonitrile. | 0.6 methyl 2-hydroxy-4-ethacryloxybenzoate. | Ammonium persulfate/sodium bisulfite in aqueous medium. | 2.10 |
| 7 | Vinyl fluoride. | 0.1 methyl 2-hydroxy-4-methacryloxybenzoate. | α,α'-Azodicyclohexanecarbonitrile. | ¹ 0.39 |

¹ Measured in hexamethylphosphoramide.

In Examples 3–6, the copolymer films, upon exposure to ultraviolet light survived without degradation for periods ranging from 3–10 times the periods survived by control films prepared from homopolymers of the corresponding compound A.

In Example 7, a copolymer film was prepared, placed over a paper backing sheet, and the combination was exposed to ultraviolet light. After 1500 hours, the paper was substantially unaffected; whereas paper placed behind a polyvinyl fluoride film and similarly exposed for 1500 hours became yellow and brittle.

*Examples 8–11.—Preparation of Laminar Structures*

As a further embodiment of this invention, a 1-mil thick film pressed from the copolymer of ethylene and methyl 2-hydroxy-4-methacryloxybenzoate described in Example 1 was laminated to a 5-mil thick polyethylene film. The latter had been melt pressed from low density polyethylene prepared according to the method described in U.S. Patent No. 2,153,553. A laminate was prepared by placing a 4" diameter sample of each film together and melt pressing the combination at a temperature of 100–110° C. using a pressure of 25 tons.

Under exposure to a bank of ultraviolet sunlamps, with the stabilizer-containing copolymeric film adjacent to the lamps, this laminate remained flexible after 1500 hours of exposure. A control sample of 6-mil thick polyethylene film became embrittled after a period of 275 hours exposure.

For Examples 9 and 10 a film of high density polyethylene made by melt pressing polyethylene prepared as described in U. S. Patent No. 2,816,883 and a film of polypropylene were each laminated to ethylene/methyl 2-hydroxy-4-methacryloxybenzoate copolymer films. In Example 11, the ethylene/methyl 2-hydroxy-4-methacryloxybenzoate copolymer film was laminated to a polyethylene terephthalate film by melt pressing at a temperature of about 150° C. All laminates showed enhanced resistance to ultraviolet light degradation over the high density polyethylene, the polypropylene and the polyethylene terephthalate films alone.

*Examples 12 and 13*

The monomer prepared in Example 1 was homopolymerized by introducing 1 gram of methyl 2-hydroxy-4-methacryloxybenzoate, 8 ml. of toluene and 0.1 gram of alpha, alpha'-azobisisobutyronitrile into a flask previously flushed with nitrogen. This mixture was heated with stirring for 45 minutes at a temperature of 95° C., during which period an atmosphere of nitrogen was maintained. A portion of the reaction mixture was cooled to room temperature and used directly for coating the substrate as described below. The remainder of the reaction mixture was placed in a vacuum oven at 50° C. where the solvent was evaporated. The inherent viscosity of the solid product remaining was measured on a solution of 0.1 gram of the polymer in 100 ml. of alpha-chloronaphthalene at 125° C. and found to be 0.69.

A 4-mil thick sheet of polyethylene film was prepared in the conventional manner from "Alathon" 10 polyethylene resin and treated to improve its adherability by the process described in U.S. Patent 2,715,076. The film was coated with the above prepared solution of the homopolymer. The solvent was evaporated by heating coated film in an oven at 50° C. leaving a coating 0.2 mil thick of the ultraviolet light stabilizing homopolymer.

When exposed to the action of a bank of Westinghouse F–S 20–T–12 sunlamps, the coated film showed no evidence of cracking after 1500 hours of such exposure. A control uncoated polyethylene film cracked when flexed after only 180 hours exposure.

In Example 13, 1 percent by weight of the above homopolymer was blended with the "Alathon" 10 polyethylene resin prior to forming a 4-mil thick film. The resulting film withstood 600 hours of exposure to the bank of Westinghouse sunlamps.

*Examples 14 and 15*

A homopolymer of methyl 2-hydroxy-4-acryloxybenzoate was prepared substantially in the manner described for Example 12. The homopolymer in a solution of toluene was coated on a 3 mil poly(vinyl chloride) film to form, after evaporation of the solvent, a 0.2 mil thick coating.

The coated film withstood 600 hours of exposure to the bank of Westinghouse sunlamps whereas an uncoated poly(vinyl chloride) film yellowed and failed after only 50 hours of exposure.

In Example 15, 1 percent by weight of the homopolymer was blended with the same poly(vinyl chloride) resin prior to forming a 5 mil thick film. The resulting film withstood 250 hours of exposure to the bank of Westinghouse sunlamps.

*Example 16.—Modification of Acrylic Adhesive*

To a solution of Eastman 910 methyl cyanoacrylate adhesive there was added 1% by weight of the adhesive solids of the polymer of methyl 2-hydroxy-4-methacryloxybenzoate prepared as described in Example 12. This adhesive solution was then used to fasten a strip of rubber to a chromium plated steel substrate. After 12 months outdoor exposure the rubber strip remained firmly adhered to the substrate; a similar adhesive bond made on a rubber strip attached with the same adhesive but without the added ultraviolet light stabilizer was no longer intact at the end of the time.

*Example 17.—Modification of Polyester Adhesive*

To a solution of 17 parts by weight of a 60/40 weight ratio ethylene terephthalate/ethylene sebacate copolyester (prepared as described in U.S. Patents Nos. 2,623,031 and 2,623,033) in 83 parts by weight of carbon tetrachloride then was added 1% by weight of the copolyester solids of poly(methyl 2-hydroxy-4-methacryloxybenzoate). A thin layer of this adhesive composition was brushed on one surface of each of two 3-mil thick sheets of polymeric linear ethylene terephthalate film. The solvent was evaporated and the adhesive coated sheets were pressed together with a pressure of 500 pounds per square inch at 90° C. for 5 minutes. The adhered laminate was then exposed to a bank of ultraviolet sunlamps for 900 hours. At the end of this time the sheets were still firmly adhered whereas a control laminate adhered with the same adhesive which did not have the added light stabilizer showed almost no adhesion under the same treatment.

Example 18.—Modification of Epoxy Adhesive

To a solution of "Epon" 1007 adhesive obtained from Shell Chemical Company there was added 1% by weight of adhesive solids of the ploymer of methyl 2-hydroxy-4-acryloxybenzoate. A thin layer of this adhesive composition was brushed on one surface of each of two sheets of tetrafluoroethylene/hexafluoropropylene copolymer film which had previously been treated in an electrical discharge in an atmosphere of nitrogen and the vapor of glycidyl methacrylate. The surfaces bearing the adhesive were pressed together for 20 minutes at 70° C. at a pressure of 75 pounds per square inch. The laminate was then exposed to a bank of ultraviolet sunlamps for 1000 hours. At the end of this time the laminate showed no impairment in bonding strength of the adhesive. A control laminate made with the same adhesive which did not contain the light stabilizer showed a reduction in bond strength of about 30% after the same period.

As indicated in the examples and in the foregoing discussion, the light-stabilizing monomers can be homopolymerized or copolymerized with polymerizable unsaturated compounds such as ethylene, propylene, vinylidene chloride, vinyl chloride, vinyl fluoride, butyl acrylate, acrylonitrile, styrene, vinyl acetate, etc. For copolymerization, any ethylenically unsaturated compound falling within the formula

may be used. Thus, butene-1, pentene-1, hexene-1, butyl methacrylate, cyclohexyl methacrylate, etc. may also be used.

One of the most surprising aspects of the present invention lies in the preparation of the polymerizable light-stabilizing monomer. It should be noted that the starting material is an aromatic compound having substituted thereon two hydroxyl groups, one of which is ortho to a carbonyl group. It is believed that this hydroxyl group ortho to the carbonyl group provides the ultraviolet light stabilizing qualities of the compound. When this compound is converted to the acrylic ester or to the alkyl-substituted acrylic ester, it is unexpectedly found that it is the other hydroxyl group (not the hydroxy group ortho to the carbonyl group) that apparently reacts exclusively. Thus, the resulting monomer retains its ultraviolet light resistant qualities.

It is also interesting to note that desipite the harshness of the polymerization process from the standpoint of temperature and pressure, the aforementioned orthohydroxyl group is not destroyed nor even affected adversely. It is of further interest that the chelated hydroxyl group does not appear to inhibit polymerization; this is indeed surprising inasmuch as phenolic compounds such as tertiary butylphenol, hydroquinone, tertiary butyl catechol and the like have long been established as agents which can be added to monomeric system to inhibit polymerization. The final polymer (copolymer and homopolymer) contains this hydroxyl group in pendant groups attached to the polymeric chain to provide the long-lasting weather-resistant properties in the polymeric structures.

As polymeric structures, self-supporting films, supported films (laminates and coatings), filaments, tubing, etc., can be formed from these copolymers for important commercial applications. Thus, these structures will find utility in the preparation of greenhouses, exterior screening, garden hose, as part of automobile exteriors, etc.

It is also possible to graft copolymerize the polymerizable light-stabilizing monomer on to a prepolymerized ethylenic or other unsaturated compound of the type defined hereinbefore. This would be especially useful where it was desired to confine the light stabilizing composition to the surface as a coating.

The main advantage of the copolymers of this invention is that a high proportion of the light-stabilizing component can be incorporated in a copolymer to give enhanced resistance to degradation from ultraviolet light without causing haziness in the film. It is also clear that the light-stabilizing function is essentially permanent. A further advantage is that a separate processing step, such as milling or dissolution, is not required to incorporate the light stabilizing composition into the base polymer. The copolymer and its light-stabilizing qualities are provide during the one-step copolymerization. Moreover, incorporation of the light stabilizer by copolymerization in this manner can be done in conventional polymerization equipment.

The homopolymers of this invention are also quite versatile. They provide enhancement of light-stabilization when used as coatings and blends with other polymeric materials. As a coating, they offer the particular advantage that the light absorber may be concentrated where it is most needed, on the surface of the degradable shaped article.

I claim:

1. A polymer of an unsaturated compound having the structural formula:

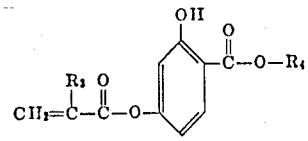

wherein
$R_3$ is selected from the group consisting of hydrogen and alkyl having 1–3 carbon atoms, and
$R_4$ is an alkyl group having 1–4 carbon atoms.

2. A weather-resistant polymeric composition comprising a copolymer of 90–99.99 mole percent of at least one unsaturated compound, compound A, having the structural formula:

wherein
$R_1$ is selected from the group consisting of hydrogen, halogen and alkyl having 1–4 carbon atoms,
$R_2$ is selected from the group consisting of hydrogen, halogen alkyl of 1–4 carbon atoms, carboalkoxy, phenyl, acetoxy, carboaryloxy, acetyl and cyano
and .01–10 mole percent of at least one unsaturated compound, compound B, having the structural formula:

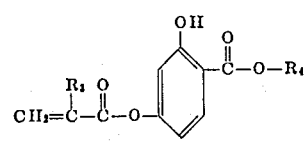

wherein
$R_3$ is selected from the group consisting of hydrogen and alkyl having 1–3 carbon atoms, and
$R_4$ is an alkyl group having 1–4 carbon atoms.

3. A weather-resistant self-supporting film which comprises a copolymer of 90–99.99 mole percent of at least one unsaturated compound, compound A, having the structural formula:

wherein
$R_1$ is selected from the group consisting of hydrogen, halogen and alkyl having 1–4 carbon atoms,
$R_2$ is selected from the group consisting of hydrogen, halogen, alkyl of 1–4 carbon atoms, carboalkoxy, phenyl, acetoxy, carboaryloxy, acetyl and cyano and .01–10 mole percent of at least one unsaturated compound, compound B, having the structural formula:

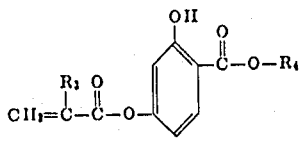

wherein
R₃ is selected from the group consisting of hydrogen and alkyl having 1–3 carbon atoms, and
R₄ is an alkyl group having 1–4 carbon atoms.

4. A copolymer of at least one unsaturated compound selected from group A consisting of ethylene, propylene, styrene, vinylidene chloride, vinyl acetate, vinyl chloride, vinyl fluoride, acrylonitrile and butyl acrylate and .01–10 mole percent of at least one ethylenically unsaturated compound selected from group B consisting of methyl 2 - hydroxy - 4 - methacryloxybenzoate and methyl 2-hydroxy-4-acryloxybenzoate.

5. A copolymer as in claim 4 wherein at least one unsaturated compound of group A is ethylene.

6. A copolymer as in claim 4 wherein at least one unsaturated compound of group A is vinyl fluoride.

7. A copolymer as in claim 4 wherein at least one unsaturated compound of group A is propylene.

8. A copolymer as in claim 4 wherein at least one unsaturated compound of group A is vinylidene chloride.

9. A copolymer as in claim 4 wherein at least one unsaturated compound of group A is butyl acrylate.

10. A copolymer as in claim 4 wherein at least one ethylenically unsaturated compound of group B is methyl 2-hydroxy-4-methacryloxybenzoate.

11. A copolymer as in claim 4 wherein at least one ethylenically unsaturated compound of group B is methyl 2-hydroxy-4-acryloxybenzoate.

12. A homopolymer of an unsaturated compound having the structural formula:

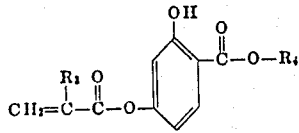

wherein
R₃ is selected from the group consisting of hydrogen and alkyl having 1–3 carbon atoms, and
R₄ is an alkyl group having 1–4 carbon atoms.

13. A weather-resistant self-supporting film which comprises a blend of a polymer selected from the group consisting of polyesters and epoxy resins and unsaturated compounds having the structural formula:

wherein
R₁ is selected from the group consisting of hydrogen, halogen and alkyl having 1–4 carbon atoms,
R₂ is selected from the group consisting of hydrogen, halogen, alkyl of 1–4 carbon atoms, carboalkoxy, phenyl, acetoxy, carboaryloxy, acetyl and cyano
with 0.5–20% by weight of the homopolymer of claim 12.

14. A weather-resistant self-supporting film which comprises a base film coated with a coating of the homopolymer of claim 13, said coating having a thickness of at least 0.1 mil.

15. A laminate comprising a base layer adhereably associated with a top layer, said top layer being a copolymer of at least one unsaturated compound, compound A, having the structural formula:

wherein
R₁ is selected from the group consisting of hydrogen, halogen and alkyl having 1–4 carbon atoms,
R₂ is selected from the group consisting of hydrogen, halogen, alkyl of 1–4 carbon atoms, carboalkoxy, phenyl, acetoxy, carboaryloxy, acetyl and cyano, and .01–10 mole percent of at least one unsaturated compound, compound B, having the structural formula:

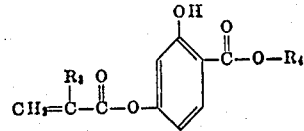

wherein
R₃ is selected from the group consisting of hydrogen and alkyl having 1–3 carbon atoms, and
R₄ is an alkyl group having 1–4 carbon atoms.

References Cited in the file of this patent
UNITED STATES PATENTS
2,345,006   Ross et al. _____ Mar. 28, 1944